US009268727B1

(12) United States Patent
Jain et al.

(10) Patent No.: US 9,268,727 B1
(45) Date of Patent: Feb. 23, 2016

(54) METHOD AND APPARATUS FOR COMMAND ABSTRACTION

(75) Inventors: Anurag Jain, Murphy, TX (US); David A. Gillam, The Colony, TX (US); Nandakishore Venkatesan, Plano, TX (US); Douglas J. Santoli, Southbury, CT (US); Frederick Crable, Allen, TX (US); Patrick J. Hunt, Baltimore, MD (US)

(73) Assignee: EMC Company, Hopkinton, MA (US)

( * ) Notice: Subject to any disclaimer, the term of this patent is extended or adjusted under 35 U.S.C. 154(b) by 70 days.

(21) Appl. No.: 13/536,357

(22) Filed: Jun. 28, 2012

(51) Int. Cl.
*G06F 13/38* (2006.01)
*G06F 3/023* (2006.01)
*G06F 3/06* (2006.01)

(52) U.S. Cl.
CPC .............. *G06F 13/385* (2013.01); *G06F 3/023* (2013.01); *G06F 3/0661* (2013.01); *G06F 13/387* (2013.01); *G06F 2206/1008* (2013.01)

(58) Field of Classification Search
None
See application file for complete search history.

(56) References Cited

U.S. PATENT DOCUMENTS

| | | | |
|---|---|---|---|
| 6,985,983 B2 * | 1/2006 | Pellegrino et al. | 710/200 |
| 7,051,101 B1 * | 5/2006 | Dubrovsky et al. | 709/225 |
| 7,203,730 B1 * | 4/2007 | Meyer et al. | 709/213 |
| 7,403,987 B1 * | 7/2008 | Marinelli et al. | 709/223 |
| 7,500,047 B1 * | 3/2009 | Tyndall et al. | 710/315 |
| 7,506,040 B1 * | 3/2009 | Rabe et al. | 709/223 |
| 7,509,400 B1 * | 3/2009 | Tanner | G06F 13/387 370/352 |
| 7,512,754 B1 | 3/2009 | Chaitanya et al. | |
| 7,587,630 B1 * | 9/2009 | Cassell et al. | 714/47.3 |
| 7,685,261 B1 * | 3/2010 | Marinelli et al. | 709/220 |
| 7,734,712 B1 * | 6/2010 | Meyer et al. | 709/213 |
| 7,743,178 B2 * | 6/2010 | Warren et al. | 710/30 |
| 7,870,300 B2 * | 1/2011 | Helman et al. | 710/5 |
| 7,921,190 B2 * | 4/2011 | Tanner | G06Q 20/202 705/21 |
| 8,180,872 B1 * | 5/2012 | Marinelli et al. | 709/223 |
| 8,549,130 B2 * | 10/2013 | Butt et al. | 709/223 |
| 2002/0089689 A1 * | 7/2002 | Ferlitsch et al. | 358/1.15 |
| 2002/0162059 A1 * | 10/2002 | McNeely et al. | 714/703 |
| 2003/0163448 A1 * | 8/2003 | Kilemba et al. | 707/1 |
| 2003/0220986 A1 * | 11/2003 | Thakor | 709/220 |
| 2006/0069868 A1 * | 3/2006 | Nonaka et al. | 711/114 |
| 2006/0230218 A1 * | 10/2006 | Warren et al. | 710/315 |
| 2007/0027973 A1 * | 2/2007 | Stein et al. | 709/223 |
| 2008/0126584 A1 * | 5/2008 | Mullis et al. | 710/7 |
| 2009/0080461 A1 * | 3/2009 | Barri et al. | 370/466 |
| 2012/0151355 A1 * | 6/2012 | Butt et al. | 715/736 |
| 2012/0166748 A1 | 6/2012 | Satoyama et al. | |

(Continued)

OTHER PUBLICATIONS

U.S. Appl. No. 13/730,037, filed Dec. 28, 2012, Kulkarni, et al.

(Continued)

*Primary Examiner* — Steven Snyder
(74) *Attorney, Agent, or Firm* — Daly, Crowley Mofford & Durkee, LLP

(57) ABSTRACT

Methods and apparatus to provide command abstraction. In one embodiment, a method includes obtaining information on commands for a plurality of devices including devices of the same type having different command structures, receiving a generic command from a user directed to one of the devices of the same type, determining, using a computer processor, whether the generic command is supported, extracting parameters from the generic command, and generating from the extracted parameters and the generic command a device-specific command for execution by the one of the devices of the same type.

16 Claims, 18 Drawing Sheets

(56) References Cited

U.S. PATENT DOCUMENTS

2013/0159359 A1    6/2013   Kumar et al.
2015/0019199 A1*   1/2015   Andrews et al. .............. 703/26

OTHER PUBLICATIONS

"Prosphere Discovery Monitoring for the Modern Data Center", White Paper, Aug. 2011, $EMC^2$, 17 pages.

"Prosphere: Next Generation Storage Resource Management", White Paper, Aug. 2011, $EMC^2$, 3 pages.

Vblock Infrastructure Platforms Series 300 Architecture Overview, Version 2.4, Aug. 2011, The Virtual Computing Environment Company, www.vce.com, 74 pages.

Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.

EMC Integrated Infastructure for VMware Enabled by EMC VNXe3100 and VMware vSphere 4.1, An Architectural Overview, White Paper, EMC Global Solutions, $EMC^2$, Feb. 2011, 24 pages.

VMware vStorage APIs for Array Integration with EMC VNX Series for NAS, Benefits for EMC VNX for File Integration with VMware VAAI, White Paper, EMC Solutions Group, Jan. 2012, $EMC^2$, 17 pages.

Vblock™ Infrastructure Platforms 2010 Vblock Platforms Architecture Overview, Version 1.3, Nov. 2011, The Virtual Computing Environment Company, www.vce.com, 25 pages.

Best Practices for Deploying VMware vCloud Director on Vblock Infrastructure Platforms, Sep. 2011, The Virtual Computing Environment Company, www.vce.com, 20 pages.

Service Catalog Strategies for Vblck™ Infrastructure Platforms, IaaS COE, Jan. 2011, The Virtual Computing Enviroment Company, www.vce.com, 19 pages.

Unified Infrastructure Manager/Provisioning, ©2011 VCE Company, The Virtual Computing Enviroment Company, www.vce.com, 3 pages.

Vblock™ Infrastructure Platforms Technical Overview, ©2011 VCE Company, The Virtural Computing Environment Company, www.vce.com, 8 pages.

Vblock™ Solution for Trusted Multi-Tenancy: Technical Overview, Aug. 2011, The Virutal Computing Environment Company, www.vce.com, 75 pages.

U.S. Appl. No. 13/730,037, filed Dec. 28, 2012, 67 pages.

U.S. Appl. No. 14/037,663, Sep. 26, 2013, Thangapalam, et al.

U.S. Appl. No. 13/730,037 Office Action dated Mar. 23, 2015, 25 pages.

Response filed Jun. 23, 2015; to Office Action dated Mar. 23, 2015; for U.S. Appl. No. 13/730,037; 12 pages.

Notice of Allowance for U.S. Appl. No. 14/037,663, filed Sep. 26, 2013.

\* cited by examiner zone name uimtestzone vsan 100 pwwn 50:06:01:60:3e:a0:04:10 pwwn 20:00:00:25:b5:99:00:00 zone name UIM_20000025B50008AB_5006016A46E00700 vsan 100 pwwn 20:00:00:25:b5:00:08:ab pwwn 50:06:01:6a:46:e0:07:00 zoneset name UIM_ZONESET_A vsan 102 zoneset activate name UIM_ZONESET_A vsan 102 zoneset name UIM_ZONESET_A vsan 103 zoneset activate name UIM_ZONESET_A vsan 103 zoneset name UIM_ZONESET_A vsan 104 zoneset name UIM_ZONESET_A vsan 105

*FIG. 8*

Device Command Parameters

VSAN ID: 3000  — 1312

Zoneset Name: DS_TEST_ZONESET  — 1314

Zone Name: DS_ZONE_6  — 1316

Optional - Zone Member list (WWPNs separated by comma or space): aa:bb:cc:dd:ee:ff:99:88,aa:bb:cc:dd:ee:ff:88:77  — 1318

Re-activate Zoneset(y/n): n  — 1320

OK    Cancel

```xml
<DeviceCommand name="Delete_Zones">
  <Param name="VSAN ID" type="String"/>
  <Param name="Zoneset Name" type="String"/>
  <Param name="Zone Names list (separated by comma or space)" type="String"/>
  <Param name="Re-activate Zoneset(y/n)" type="String"/>
</DeviceCommand>
<DeviceCommand name="Delete_All_Zones_From_Zoneset">
  <Param name="VSAN ID" type="String"/>
  <Param name="Zoneset Name" type="String"/>
  <Param name="Re-activate Zoneset(y/n)" type="String"/>
</DeviceCommand>
<DeviceCommand name="Create_Zone">
  <Param name="VSAN ID" type="String"/>            ―1312
  <Param name="Zoneset Name" type="String"/>       ―1314
  <Param name="Zone Name" type="String"/>          ―1316
  <Param name="Optional - Zone Member list (WWPNs separated by comma or space)" type="String"/>  ―1318
  <Param name="Re-activate Zoneset(y/n)" type="String"/>  ―1320
</DeviceCommand>
<DeviceCommand name="Remove_WWPN_Zone_Members_From_Zone">
  <Param name="VSAN ID" type="String"/>
  <Param name="Zoneset Name" type="String"/>
  <Param name="Zone Name" type="String"/>
  <Param name="Zone Member list (WWPNs separated by comma or space)" type="String"/>
  <Param name="Re-activate Zoneset(y/n)" type="String"/>
</DeviceCommand>
<DeviceCommand name="Add_WWPN_Zone_Members_To_Zone">
  <Param name="VSAN ID" type="String"/>
  <Param name="Zoneset Name" type="String"/>
  <Param name="Zone Name" type="String"/>
  <Param name="Zone Member list (WWPNs separated by comma or space)" type="String"/>
  <Param name="Re-activate Zoneset(y/n)" type="String"/>
</DeviceCommand>
```

*FIG. 13C*

```xml
<DeviceCommand name="Create_RAID_Group_Volumes">
    <Param name="RAID Group ID" type="Integer"/>
    <Param name="Size in GB" type="Integer"/>
    <Param name="RAID Level (e.g. RAID5(3+1))" type="String"/>
    <Param name="Volume Name list (separated by comma)" type="String"/>
    <Param name="Number of volumes to create" type="Integer"/>
</DeviceCommand>
<DeviceCommand name="Delete_RAID_Group_Volumes">
    <Param name="RAID Group ID" type="Integer"/>
    <Param name="Storage volume ID (ALU) list (separated by comma or space)" type="String"/>
</DeviceCommand>
<DeviceCommand name="Create_Thin_Pool_Volumes">
    <Param name="Thin Pool ID" type="String"/>
    <Param name="Size in GB" type="Integer"/>
    <Param name="RAID Level (e.g. RAID5(3+1))" type="String"/>
    <Param name="Volume Name list (separated by comma)" type="String"/>
    <Param name="Number of volumes to create" type="Integer"/>
</DeviceCommand>
<DeviceCommand name="Delete_Thin_Pool_Volumes">
    <Param name="Thin Pool ID" type="String"/>
    <Param name="Storage volume ID (ALU) list (separated by comma or space)" type="String"/>
</DeviceCommand>
<DeviceCommand name="Create_Storage_Group">
    <Param name="Storage Group Name" type="String"/>
    <Param name="LUN ID (HLU) list (separated by comma or space)" type="String"/>
    <Param name="Storage Volume ID list (separated by comma or space)" type="String"/>
    <Param name="Array Port list (e.g. 10E:0) (separated by comma or space)" type="String"/>
    <Param name="Host Initiator WWPN list (e.g. 11:22:33:44:5:66:77:88) (separated by comma or space)" type="String"/>
</DeviceCommand>
<DeviceCommand name="Delete_Storage_Group">
    <Param name="Storage Group Name" type="String"/>
</DeviceCommand>
<DeviceCommand name="Add_Host_Initiators_To_Storage_Group">
    <Param name="Storage Group Name" type="String"/>
    <Param name="Host Initiator WWPN list (e.g. 11:22:33:44:5:66:77:88) (separated by comma or space)" type="String"/>
</DeviceCommand>
<DeviceCommand name="Remove_Host_Initiators_From_Storage_Group">
    <Param name="Storage Group Name" type="String"/>
    <Param name="Host Initiator WWPN list (e.g. 11:22:33:44:5:66:77:88) (separated by comma or space)" type="String"/>
</DeviceCommand>
<DeviceCommand name="Add_LUNs_To_Storage_Group">
    <Param name="Storage Group Name" type="String"/>
    <Param name="LUN ID (HLU) list (separated by comma or space)" type="String"/>
    <Param name="Storage Volume ID (ALU) list (separated by comma or space)" type="String"/>
</DeviceCommand>
<DeviceCommand name="Remove_LUNs_From_Storage_Group">
    <Param name="Storage Group Name" type="String"/>
    <Param name="LUN ID *HLU) list (separated by comma or space)" type="String"/>
</DeviceCommand>
```

*FIG. 13D*

```xml
<DeviceCommand name="Create_FileSystem">
    <Param name="Pool Name" type="String"/>
    <Param name="FileSystem Name" type="String"/>
    <Param name="Size in GB" type="Integer"/>
    <Param name="Type (uxfs|rawfs|mirrorfs|ckpt|mgfs|group|nmfs)" type="String"/>
    <Param name="Dedupe (on|off|suspended|unknown)" type="String"/>
    <Param name="WORM (disabled|compliance|enterprise)" type="String"/>
    <Param name="Autoextend this FileSystem (true|false)" type="String"/>
    <Param name="Autoextend HWM Percentage" type="Integer"/>
    <Param name="Autoextend Max Size in GB" type="Integer"/>
    <Param name="Thin Autoextend (true|false)" type="String"/>
</DeviceCommand>
<DeviceCommand name="Delete_FileSystem">
    <Param name="FileSystem Name" type="String"/>
</DeviceCommand>
<DeviceCommand name="Create_MountPoint">
    <Param name="DataMover Name" type="String"/>
    <Param name="Path" type="String"/>
</DeviceCommand>
<DeviceCommand name="Delete_MountPoint">
    <Param name="DataMover Name" type="String"/>
    <Param name="Path" type="String"/>
</DeviceCommand>
<DeviceCommand name="Mount_FileSystem">
    <Param name="DataMover Name" type="String"/>
    <Param name="Path" type="String"/>
    <Param name="FileSystem Name" type="String"/>
    <Param name="Mode (ReadOnly|ReadWrite)" type="String"/>
</DeviceCommand>
<DeviceCommand name="Unmount_FileSystem">
    <Param name="DataMover Name" type="String"/>
    <Param name="Path" type="String"/>
    </DeviceCommand>
    <DeviceCommand name="Export_FileSystem">
    <Param name="DataMover Name" type="String"/>
    <Param name="Path" type="String"/>
    <Param name="NFS Auth Mode (sys|krb5|krb5i|krb5p)" type="String"/>
    <Param name="ReadOnly (true|false)" type="String"/>
    <Param name="Public (true|false)" type="String"/>
    <Param name="WebRoot (true|false)" type="String"/>
    <Param name="ReadOnly Clients Allowed" type="String"/>
    <Param name="ReadOnly Clients Excluded" type="String"/>
    <Param name="ReadWrite Clients Allowed" type="String"/>
    <Param name="ReadWrite Clients Excluded" type="String"/>
    <Param name="Root Clients Allowed" type="String"/>
    <Param name="Root Clients Excluded" type="String"/>
    <Param name="Access Clients Allowed" type="String"/>
    <Param name="Access Clients Excluded" type="String"/>
    <Param name="Anonymous UID" type="String"/>
</DeviceCommand>
<DeviceCommand name="Unexport_FileSystem">
    <Param name="DataMover Name" type="String"/>
    <Param name="Path" type="String"/>
</DeviceCommand>
```

*FIG. 13E*

METHOD AND APPARATUS FOR COMMAND ABSTRACTION

BACKGROUND

As is known in the art, storage systems, such as cloud storage systems, contain a relatively large number of hardware devices and components and software applications, modules, and components. With many different infrastructure devices in the cloud storage system, it can be challenging to deal with constantly changing syntax for the commands and APIs (application programming interfaces) of individual devices. This can be especially true when the storage or SAN (storage area network) administrator wants to run the command over a CLI (command line interface) for debugging or troubleshooting a particular infrastructure device, such as a SAN switch or a storage array. Also, using the various element management systems with their own unique user interfaces is virtually impossible as it requires one to keep up with the ever changing cloud vendor providers. This creates 'personnel' silos of tribal knowledge in the cloud management organizations since SAN and Storage administrators typically manually log in to the CLIs or element managers of individual infrastructure components, attempt to remember the exact command syntax, and then run the commands to debug component issues.

SUMMARY

Exemplary method and apparatus embodiments of the invention abstract the underlying complexity of CLI protocols and/or command syntaxes to individual infrastructure components and present to the end user an inventive interface that can send commands to various devices having different protocol/syntax without the need to access individual CLIs and/or remember device credentials. Exemplary commands include create zone, create storage volume, and the like. The results can then be used to validate health of the individual cloud components.

In one aspect of the invention, a method comprises: obtaining information on commands for a plurality of devices including devices of the same type having different command structures, receiving a generic command from a user directed to one of the devices of the same type, determining, using a computer processor, whether the generic command is supported, extracting parameters from the generic command, and generating from the extracted parameters and the generic command a device-specific command for execution by the one of the devices of the same type.

The method can further include one or more of the following features: providing a single user interface to obtain information from the user for the generic command that can be used for any one of the devices of the same type having different command structures, a first device type includes storage devices, a second device type includes blades, a third device type includes SAN devices, and a fourth device type includes switches, the first device type includes storage devices from different vendors, the second device type includes switches from different vendors, the third device type includes SAN devices from different vendors, and/or the fourth device type includes switches from different vendors.

In another aspect of the invention, an article comprises: a computer-readable medium containing non-transitory stored instructions that enable a machine to perform: obtaining information on commands for a plurality of devices including devices of the same type having different command structures, receiving a generic command from a user directed to one of the devices of the same type, determining, using a computer processor, whether the generic command is supported, extracting parameters from the generic command, and generating from the extracted parameters and the generic command a device-specific command for execution by the one of the devices of the same type.

The article can further include one or more of the following features: providing a single user interface to obtain information from the user for the generic command that can be used for any one of the devices of the same type having different command structures, a first device type includes storage devices, a second device type includes blades, a third device type includes SAN devices, and a fourth device type includes switches, the first device type includes storage devices from different vendors, the second device type includes blades from different vendors, the third device type includes SAN devices from different vendors, the fourth device type includes switches from different vendors.

In a further aspect of the invention, a system comprises: a command abstraction module comprising: a user interface to receive generic commands from a user, a command processor module to receive the generic command and confirm the generic command is supported, a parameter extraction module to extract parameters from the generic command, a command generator module to create a device-specific command from the extracted parameters and the generic command, the device-specific command having a syntax specific to particular device type, wherein the command abstraction module can generate device-specific commands for a plurality of device types from the generic command.

The system can further include one or more of the following features: the plurality of device types includes components from different vendors, the system comprises a cloud storage system comprising: a compute layer, a storage layer, a network layer coupled between the compute and storage layer, and a management layer to control the system, wherein the plurality of device types include storage components having different command line interfaces (CLIs), and/or the plurality of device types include a first device type including storage devices, a second device type including blades, a third device type including SAN devices, and a fourth device type including switches.

BRIEF DESCRIPTION OF THE DRAWINGS

The foregoing features of this invention, as well as the invention itself, may be more fully understood from the following description of the drawings in which:

FIG. 8 is a representation of raw configuration data;

FIG. 13B is a user interface to enable a user to input parameters for a command;

FIGS. 13C-E are listings of parameters for various commands;

DETAILED DESCRIPTION

Figure 1:
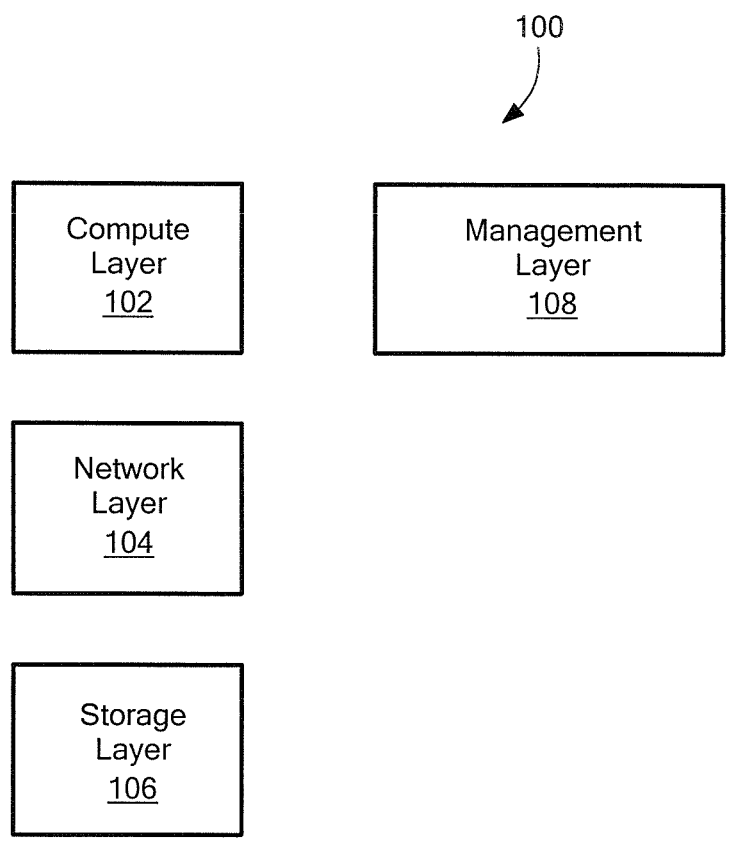
FIG. 1 is a high level schematic representation of a cloud storage system having cross domain event correlation in accordance with exemplary embodiments of the invention.

FIG. 1 shows an exemplary cloud storage environment 100 having command abstraction in accordance with exemplary embodiments of the invention. The environment includes a compute domain 102, a network domain 104, a storage domain 106, and a management domain 108. The environment may be referred to as a platform. It is understood that any practical number of platforms can be combined into a cloud storage environment.

The compute domain 102 comprises components, such as blade servers, chassis and fabric interconnects that provide the computing power for the platform. The storage domain 106 comprises the storage components for the platform. The network domain 104 comprises the components that provide switching and routing between the compute and storage domains 102, 106 within and between platforms, and to the client or customer network.

Figure 2:
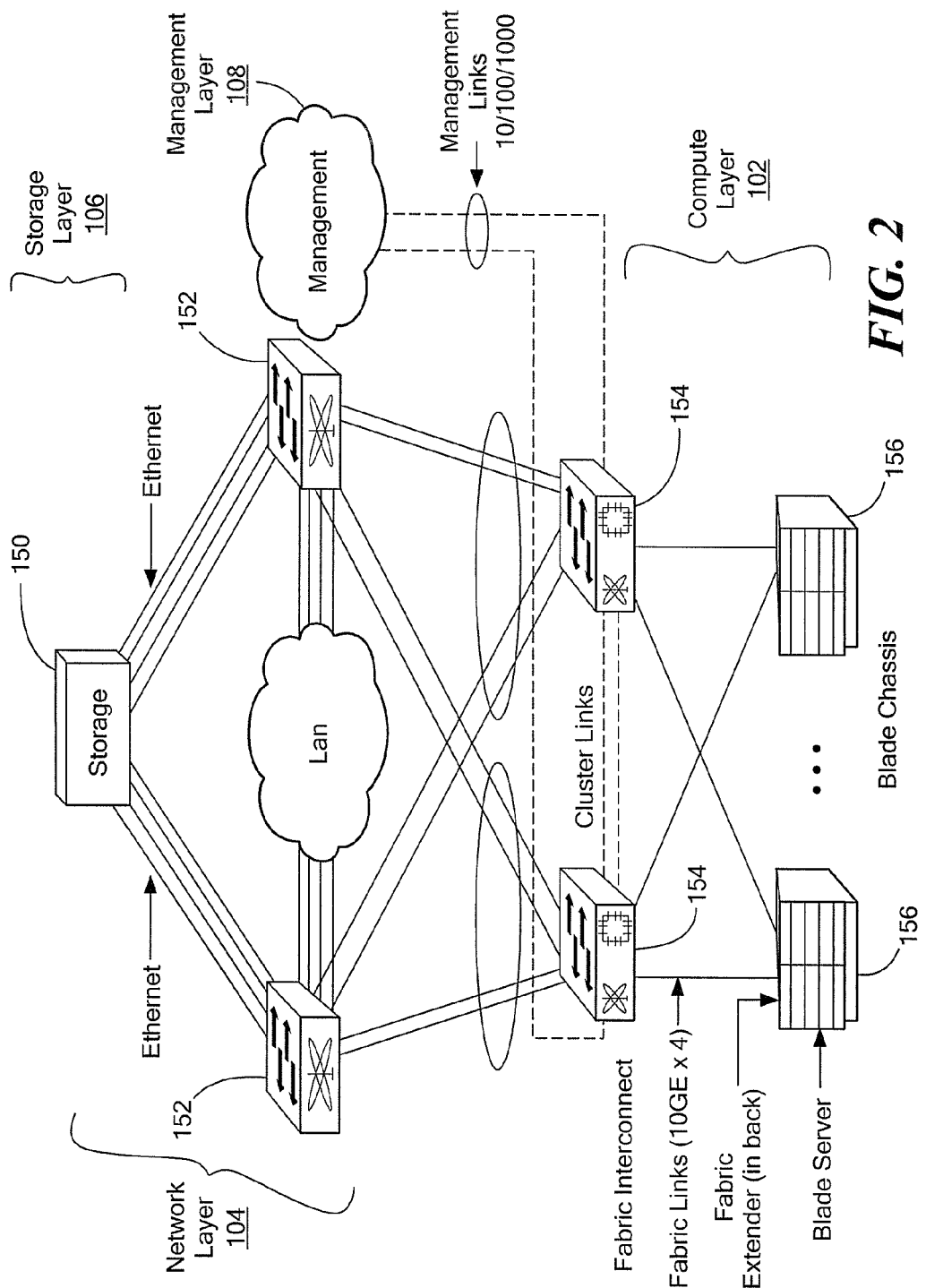
FIG. 2 is a schematic representation showing further detail of the cloud storage system of FIG. 1 including interconnections.

FIG. 2 shows further detail for the environment 100 of FIG. 1. The storage domain 106 can include storage components 150, such as CLARIION storage components from EMC Corporation of Hopkinton Mass. The network domain 104 (for both SAN and LAN networks) can include a pair of switches 152, such as MDS 9000 Series Multilayer SAN Switches from Cisco of San Jose, Calif., coupled to the storage components and to a LAN. The compute domain 102 can include a pair of fabric interconnects 154, such as CISCO 6100 series devices. The compute domain can further include a number of blade servers 156, such as CISCO 5100 blade chassis. The management domain 108 can be coupled to the compute domain 102.

Figure 3:
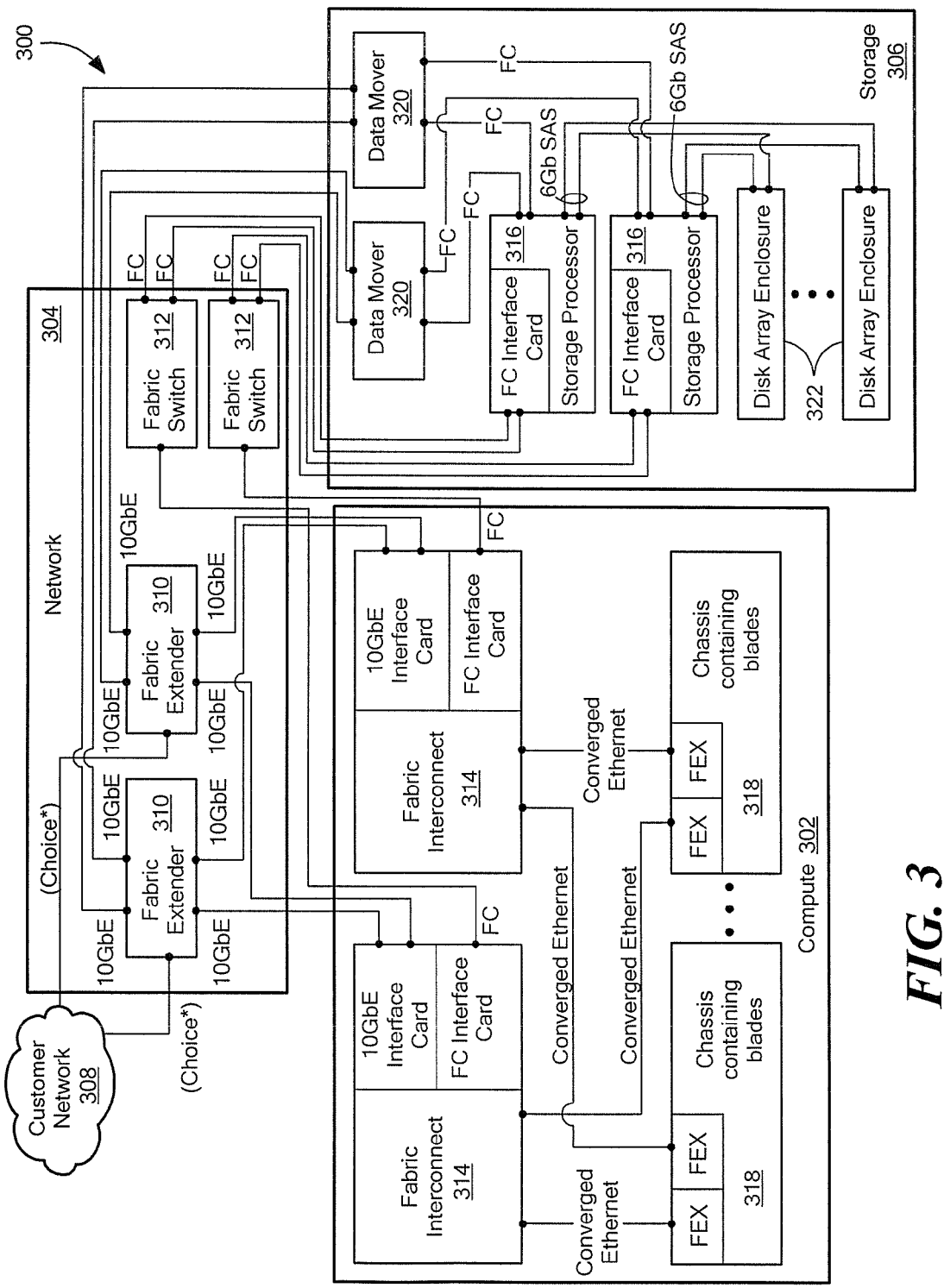
FIG. 3 is a schematic representation showing further detail of the cloud storage system of FIG. 2 including system components.
Figure 4:
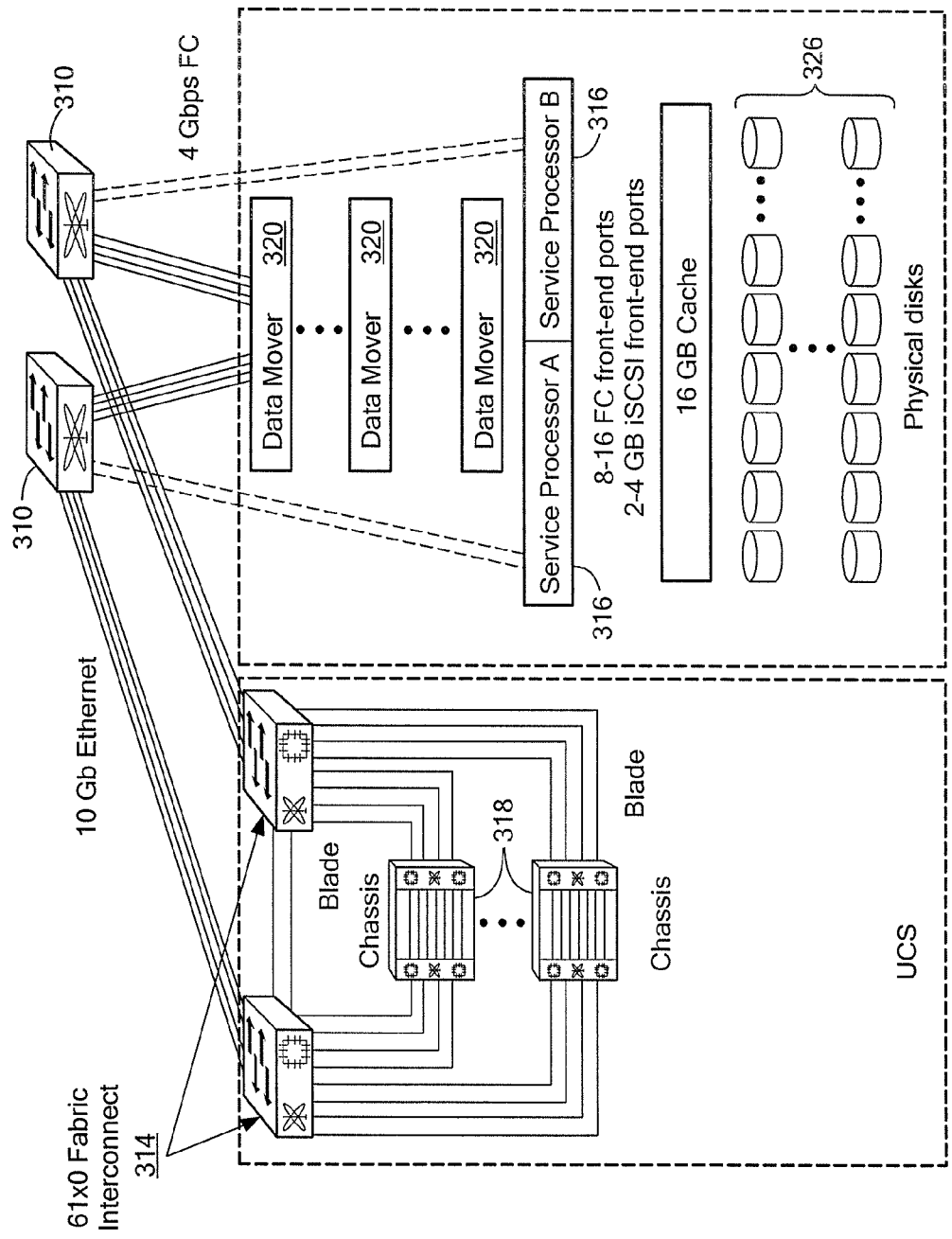
FIG. 4 is a schematic representation showing further detail of a storage domain of the cloud storage system of FIG. 3 using NAS for the storage domain.

FIG. 3 shows further detail of an exemplary cloud environment having a compute domain 302, a network domain 304 and a storage domain 306. The network domain 304 is coupled to a customer network 308 in a manner known in the art. The network domain 304 includes switches 310 coupled to the customer network 308. The network domain 304 also includes multilayer fabric switches 312 coupled to fabric interconnects 314 in the compute domain 302 and to storage processors 316 in the storage domain 306. The fabric interconnects 314 are coupled to blade server chassis 318 containing blades. Data movers 320 in the storage domain 306 are coupled between the storage processors 316 and the switches 310 in the network domain. Disk array enclosures 322 are coupled to the storage processors 316. FIG. 4 shows interconnections for a system similar to that shown in FIG. 3 with physical disks 326. In the illustrated embodiment, the storage domain includes 8 to 16 front end fibre channel ports and 2-4 GB iSCSI front end ports. It is understood that a variety of other configurations having different interconnections and storage configuration can be provided to meet the needs of a particular application.

The management domain can include a number of applications to perform various functions for overall control, configuration, etc of the various platform components. For example, management applications can include a virtualization function, such as VSPHERE/VCENTER, by VMware of Palto Alto, Calif. A further management application can be provided as the Unified Computing System (UCS) by Cisco. It is understood that the blade chassis and fabric interconnection can be considered part of the UCS. Another management application can include a management interface, such as EMC UNISPHERE, to provide a flexible, integrated experience for managing existing storage systems, such as CLARIION and CELERRA storage devices from EMC. A further management application includes a platform element manager, such as Unified Infrastructure Manager (UIM) by EMC, for managing the configuration, provisioning, and compliance of the platform.

It is understand that these management interfaces are native element managers. Exemplary embodiments of the invention may not rely on the element manager GUI interfaces, but rather, the native command line and/or API based interfaces to communicate with the cloud components.

Figure 5:
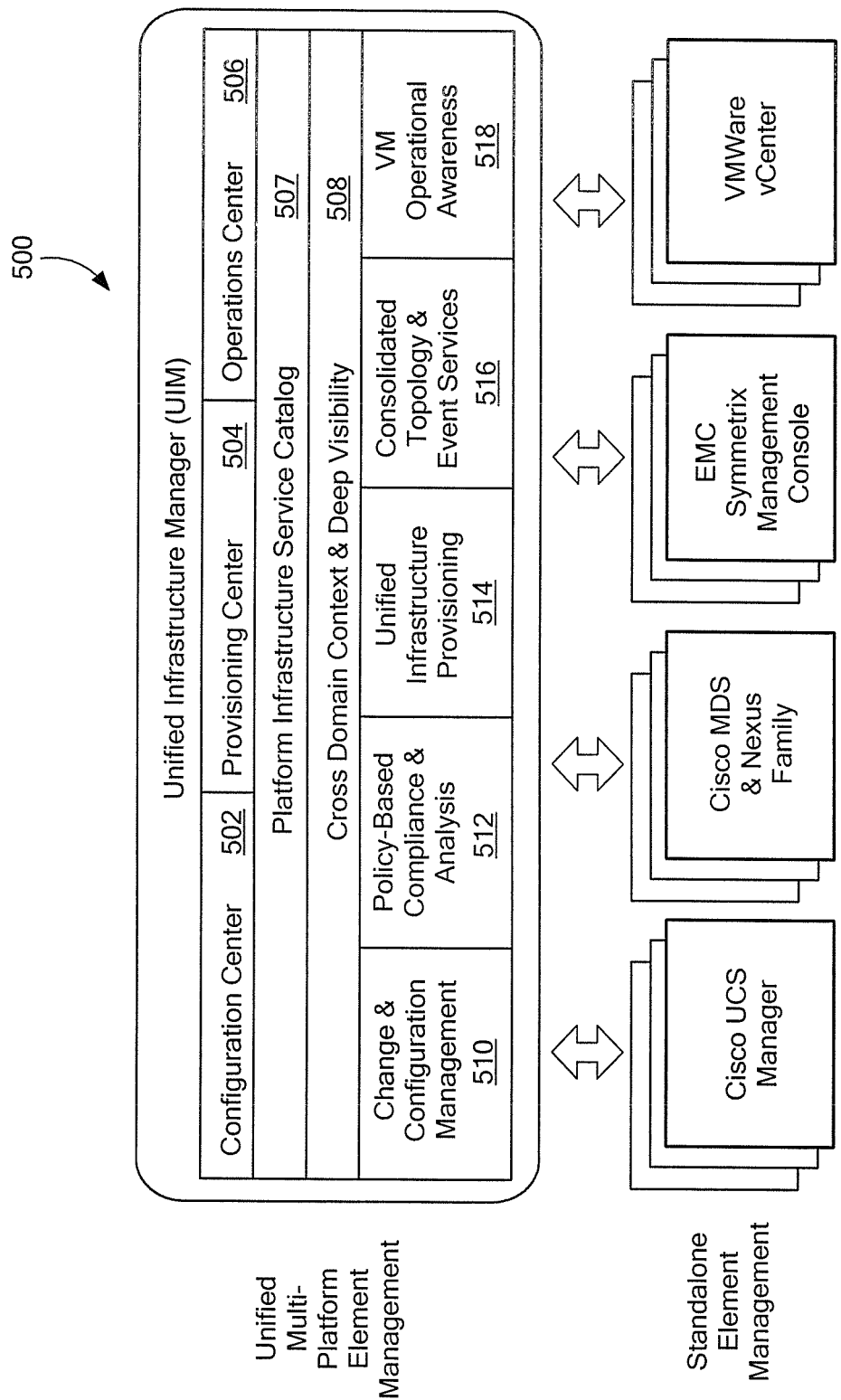
FIG. 5 is a schematic representation of a unified infrastructure manager (UIM) module showing component layering.

FIG. 5 shows an exemplary unified infrastructure manager 500 having command abstraction in accordance with exemplary embodiments of the invention. In one embodiment, the unified infrastructure manager 500 includes a configuration center module 502, a provisioning center module 504, and an operations center module 506. Below these modules is a platform infrastructure service catalog 506 and a cross domain context and visibility module 508.

The unified infrastructure manager 500 further includes a change and configuration management module 510, a policy-based compliance and analysis module 512, a unified infrastructure provisioning module 514, a consolidation topology and event service module 516, and an operational awareness module 518. The various modules interact with platform elements, such as devices in compute, network and storage domains, and other management applications.

In one aspect of the invention, a uniform infrastructure management module includes a command abstraction module to receive generic user commands and process the commands for various types of physical infrastructure, logical services, virtual applications, and tenant/organizations.

It is understood that various vendor specific terminology, product name, jargon, etc., may be used herein. It is further understood that such vendor specific information is used to facilitate an understanding of embodiments of the invention and should not limit the invention in any way. Any specific vendor information should be construed to mean a generic product, function, or module.

Some exemplary items are set forth below. It is understood that one of ordinary skill in the art is familiar with the generic architecture and functionality of a vendor specific terms.

UIM/Provisioning or UIM/P: EMC Unified Infrastructure Management/Provisioning that provides simplified management for VCE VBLOCK by managing the components of VBLOCK platforms as a single entity and easily define and create infrastructure service profiles to match business requirements.

Cisco UCS: Cisco Unified Computing System.

VMWARE VSPHERE: A virtualization platform for building cloud infrastructures

ESX/ESXi: An enterprise-level computer virtualization product offered by VMware.

VM: Virtual Machine

VBLOCK: A pre-architected and pre-qualified environment for virtualization at scale: storage, fabric, compute, hypervisor, management and security.

Model Service Adapter: A service that uses the RESTful interface to expose the types of resources and instances of the data sources.

vApp: Virtual Application vCD: VMware vCloud Director

Figure 6:
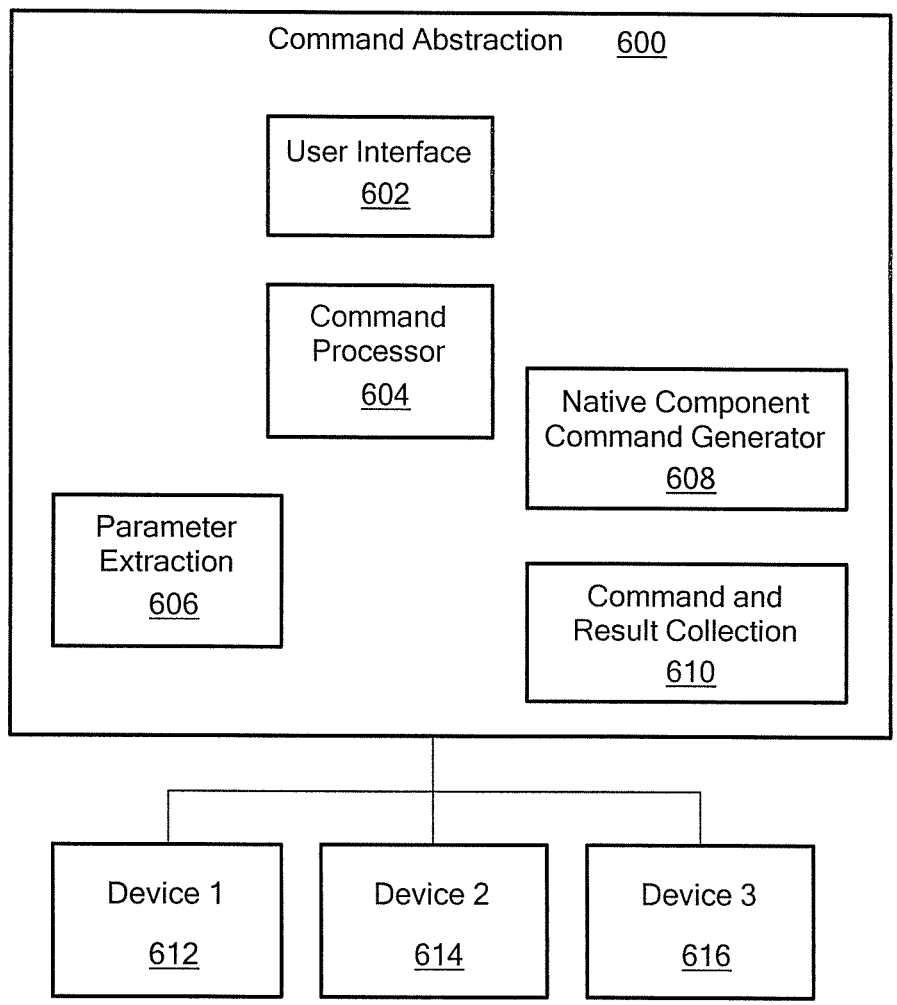
FIG. 6 is a schematic representation of a command abstraction module.

FIG. 6 shows an exemplary command abstraction module 600 to enable a user to enter commands that can be processed and sent to resources in the system having different command/syntax structures. For example, a user can enter a generic command that can be processed and sent to devices of different types, such as storage volumes from three different vendors. The user does not need to know the protocol/syntax for the different storage volumes, but rather, can use the same command for the three different storage volume types.

In an exemplary embodiment, the command abstraction module 600 forms part of the management domain for the cloud storage system. In an alternative embodiment, the command abstraction module 600 forms a part of the management domain for a particular domain, such as the management module for the storage domain. It is understood that the command abstraction module 600 can be located in any suitable location within the cloud system in which the module can interact with the user and the resources of interest.

The command abstraction module 600 includes a user interface 602 to enable interaction with the user, such as to receive user commands. A command processor module 604 receives generic commands from the user and processes the commands for the target resource. A parameter extraction module 606 extracts parameters from the generic command generated by the user for insertion into the resource-specific command. A native component command generator module 608 receives parameter information from the parameter extraction module 606 and formats information from the command processor module 604 to generate the resource-specific command in the format for the target resource, as explained more fully below. In an exemplary embodiment, a user command can be processed for any one of a first, second, or third device 612, 614, 616, all of which have different command interfaces.

A command and result collection module 610 collects and stores command information from the various devices. The system executes the native command structures on the devices using remote communication channels, then collects the results by reading the API or command output. In case of raw command line interfaces the output may be collected using terminal scraping techniques, for example. The system then validate and transforms the results into the normalized model using data transformation techniques, such as regex, XML, XSD and/or XSLT. In general, raw configuration data is extracted, parsed and normalized into a generic model for a particular type of resource. The resource model is persisted as cloud component state in a relational database. The simplified commands then act on the normalized data so user does not need to know cloud component specific attributes or command parameters. Essentially this abstracts cloud component complexities/behavior and provides end users a simplified interface.

Figure 7:
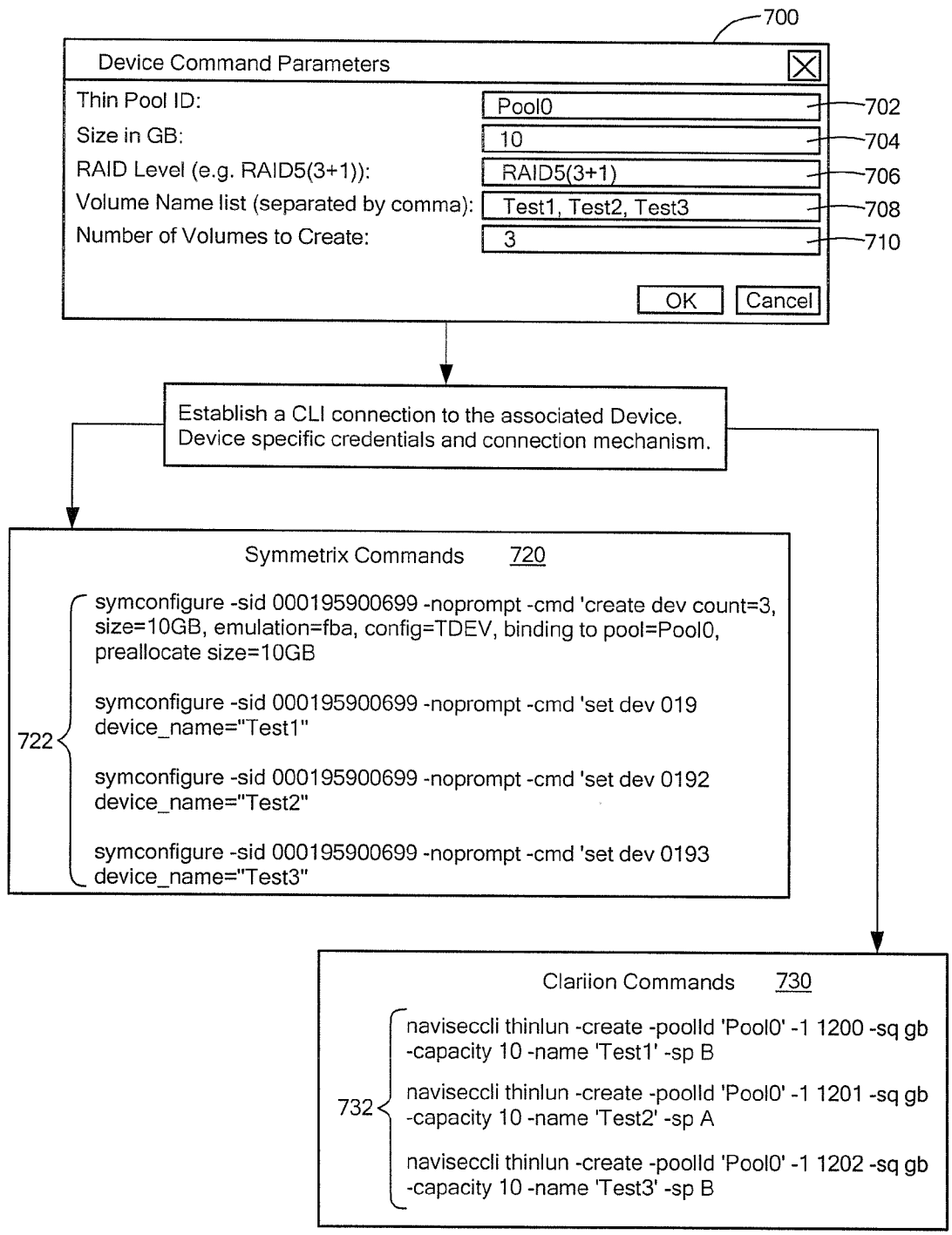
FIG. 7 is a representation of a user interface having fields for commands for a different storage devices.

FIG. 7 shows an exemplary command abstraction example for an EMC SYMMETRIX volume and and EMC CLARIION volume each having different CLIs. An exemplary graphical user interface (GUI) 700 has fields that can be filled out by a user for an illustrative 'create thin pool volumes' command. A thin pool ID field 702 enables a user to provide a pool ID. A size field 704 enables a user to select a size for the pool volumes. A RAID field 706 enables a user to selected a desired level of storage redundancy. A volume name list field 708 enables a user to list names of the volumes. A number of volumes field 710 enables a user to specify the number of volumes that should be created.

A SYMMETRIX storage device 720 and a CLARIION device 730 are system resources to which the user can provide commands via the command abstraction module. Illustrative CLI commands 722 are shown for the SYMMETRIX device.

The thin pool ID field 702 is the identifier of the storage pool as identified by the generic model, which can uniquely translate this to an actual storage pool array entity. The size field 704 is the size of the required storage volume to be created. The RAID field 706 defines the protection level for the volume. The volume name list field 708 includes the user-assigned names for the storage volumes. The number of volumes field list 710 includes the number of volumes to create so a bulk operation can be performed. The Symmetrix specific commands 720 are stringed together by the underlying abstraction layers to do the task on symmetrix, and similarly for the Clariion commands 730.

Note that for SYMMETRIX all volumes are created together and then named separately while on cCLARIION each volume is created separately and named during creation. This illustrates how the command behavior and syntax is abstracted.

FIG. 8 shows exemplary data in raw form after it is extracted from the device, but before it is converted to the generic model. Note that the data is is semi-structured in form, the data is from a CISCO MDS SAN device. The form can be different on a device from a different vendor.

Figure 9:
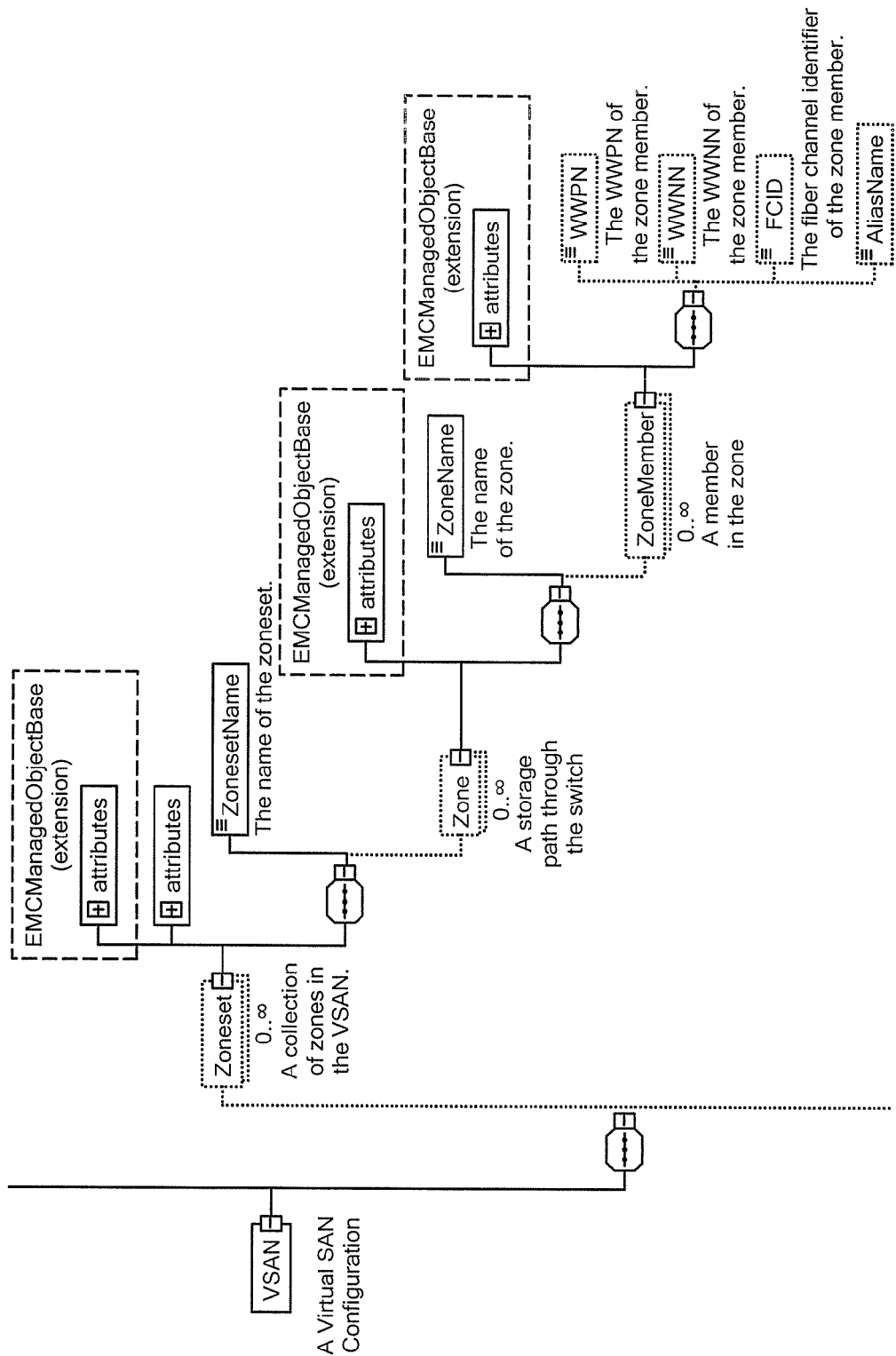
FIG. 9 is a schematic representation of a model for the raw configuration data of FIG. 8.

FIG. 9 shows an exemplary transformation of the raw data of FIG. 8 into a generic model, which can be persisted as a cloud component state. It should be noted that the raw configuration data does not explicitly relate zone names to members, that is left to the interpretation and understanding of the expert user to interpret the relationship from the data in the raw configuration. Once the raw configuration is ingested and transformed, the zone and members are correlated and persisted as per relationships model indicated in FIG. 9. In the example, two zones with each of their two zone members are persisted as objects in a relational database along with their relationships that can later be queried and traversed via SQL and other techniques.

Figure 10:
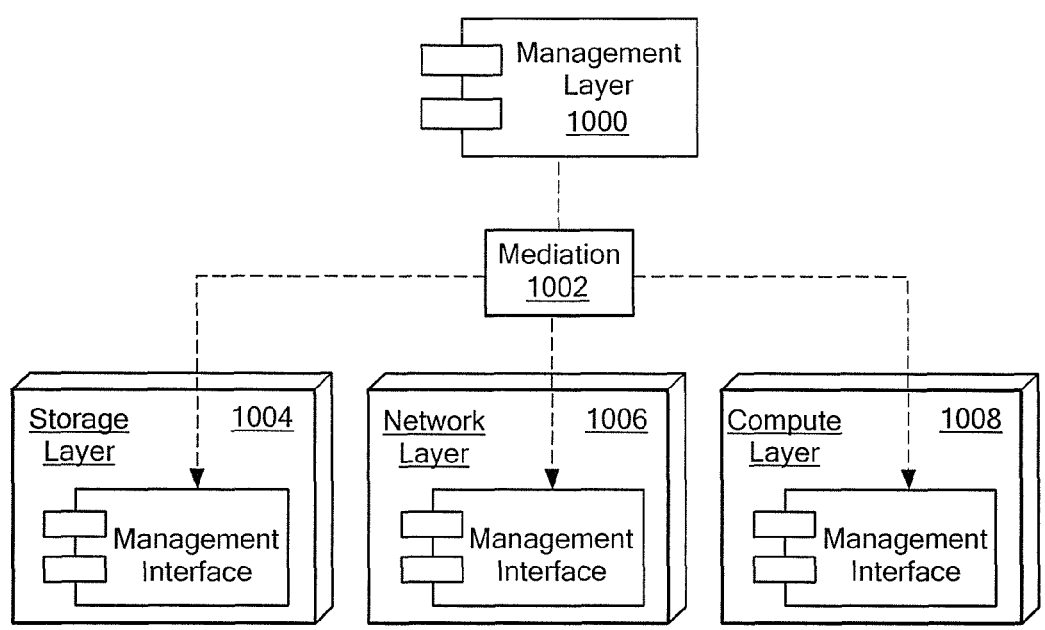
FIG. 10 is a representation of a model for exemplary types of components.

FIG. 10 indicates exemplary types of components. A generic management layer 1000 is coupled via mediation 1002 to native management interfaces to devices for storage 1004, network 1006, and compute 1008 layers. The mediation component 1002 is a device mediation layer for transforming generic methods to device specific methods, which encapsulate device specific functions and behavior.

Command syntax and other intelligence on how to execute the commands is programmed into modules that are customizable and pluggable so support for new devices/command syntaxes can easily be added. Models are domain specific so that, for example, a SAN model is different from a storage model. With this arrangement, cloud components from various vendors providing functions in a particular domain can be served by the same generic model.

Figure 11:
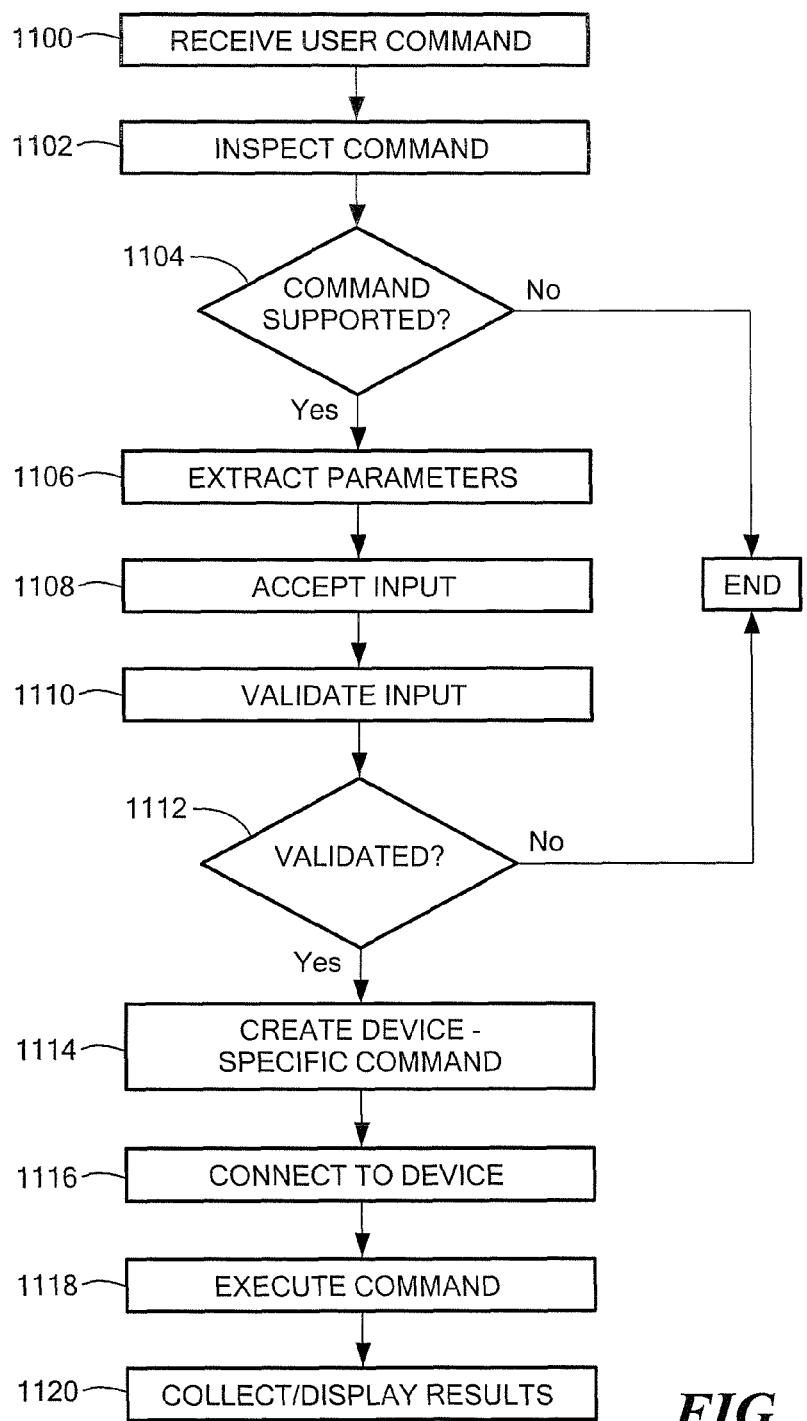
FIG. 11 is a flow diagram showing an exemplary sequence of steps for command abstraction.

FIG. 11 shows an exemplary sequence of steps for abstracting commands in accordance with exemplary embodiments of the invention. In general, user input is accepted and validated before execution of the command and collection of results. The system interacts with generic models to validate user input. For example in a SAN specific command to create zones, the supplied vsan, zoneset, zone name parameters are checked against existing data (persisted in the model) for duplication/correctness.

In step 1100, a user command is received and inspected in step 1102. In step 1104, it is determined whether the command is supported. If not, processing terminates if there are no generic commands supported for a device. In one embodiment, this is determined statically via declarative means in the system. If so, in step 1106 parameters, see, e.g., FIG. 7, in the user command are extracted. In step 1108, the user input is accepted. In step 1110, the input is validated against the device model/state. For example, if the user wants to create a zone member in a particular san zone, the system can validate if the supplied zone name is in the persisted data model before attempting to create a zone member. This helps to indicate errors early.

In step 1112, it is determined whether the input has been validated against the model. If not, processing terminates. If so, in step 1114, a device-specific command is created containing the parameters provided by the user command and formatted for the syntax required for the target device. The device mediation software layer transforms generic methods to device specific methods and device specific output to a generic model. Device mediation also encapsulates device specific functions and behavior so that a common generic interface can be presented to the end user. In step 1116, a connection is made with the target device and the command is executed by the target device in step 1118. In step 1120, the command results are collected and/or displayed for the user.

Figure 12:
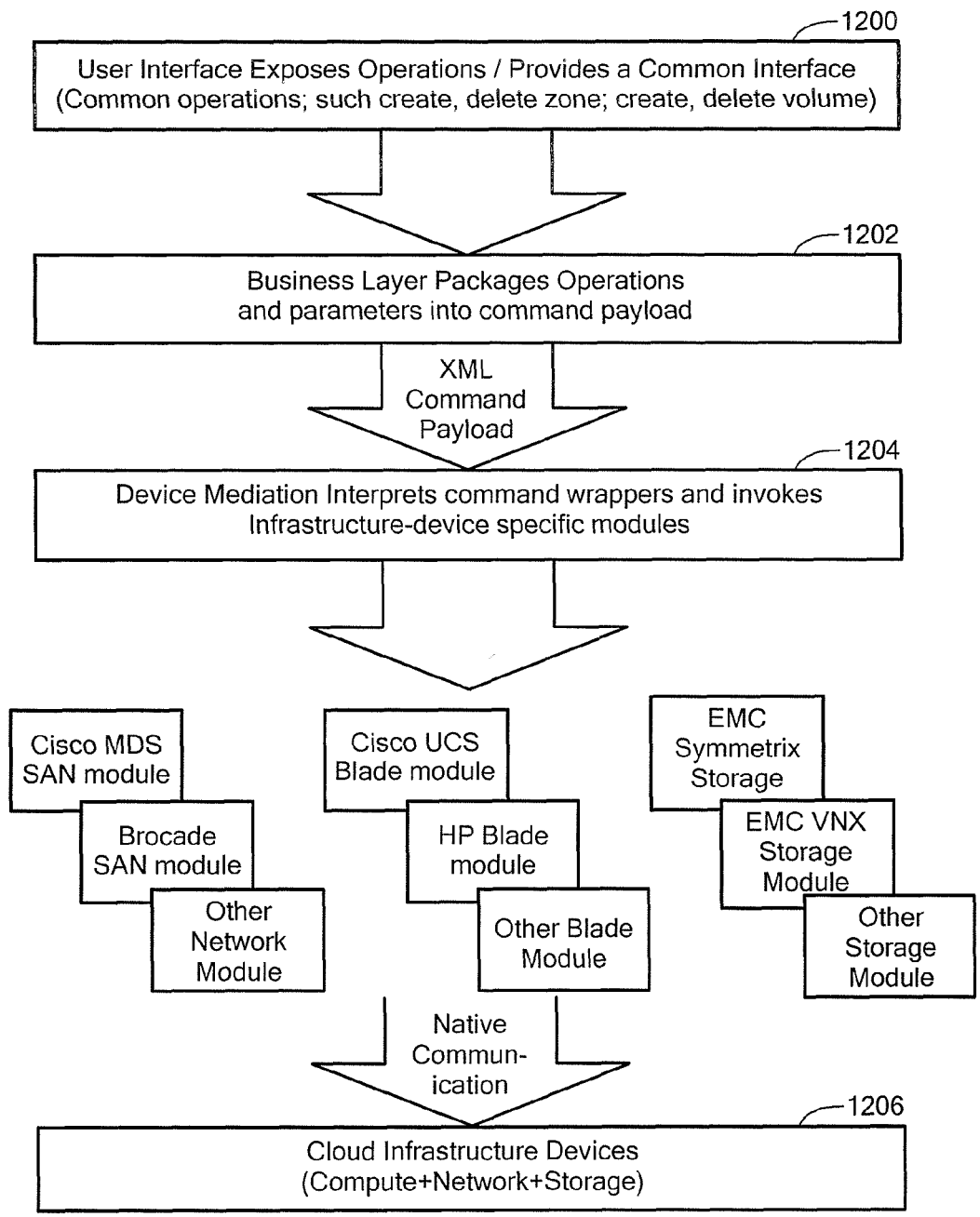
FIG. 12 is a representation of layers providing command abstraction.

FIG. 12 shows further detail on the various layers to abstract and simplify the component complexities. For example, the modules hide individual cloud component complexities from the upper layers. These modules are cohesive/decoupled units of software that can be changed/expanded/plugged for different cloud components.

In 1200, a command abstraction module obtains command information for resources in a cloud storage system. In one embodiment, devices in the cloud system expose via a user interface layer their operation/command structure to the command abstraction module. Exemplary operations having specific commands include create zone, delete zone, create volume, delete volume, etc. In 1202, the user command is processed in a processing layer to extract parameters and format a device-specific command in the form of an XML command payload, for example, for the target device. In 1204, a device mediation layer interprets command wrappers and invokes device-specific modules. The mediation layer formats a command for the target device, such as a CISCO, BROCADE, or other SAN module, a CISCO, HP, or other blade module, or an EMC SYMMETRIX, EMC VNX, or other storage module. The device-specific command is then sent in 1206 to the cloud infrastructure device.

As discussed above, pluggable software modules are programmed to understand the generic model and parameters of generic commands. These modules have the intelligence to extract the individual parameters and generate the device specific command syntax. For example, for creation of a storage volume (see, e.g., FIG. 7) the required size, raid level, etc., are provided by the user and the modules extract the individual values of the size, raid level and other parameters and programmatically build the command syntax by stringing together these values in the order and syntax that is supported for the particular device.

Figure 13A:
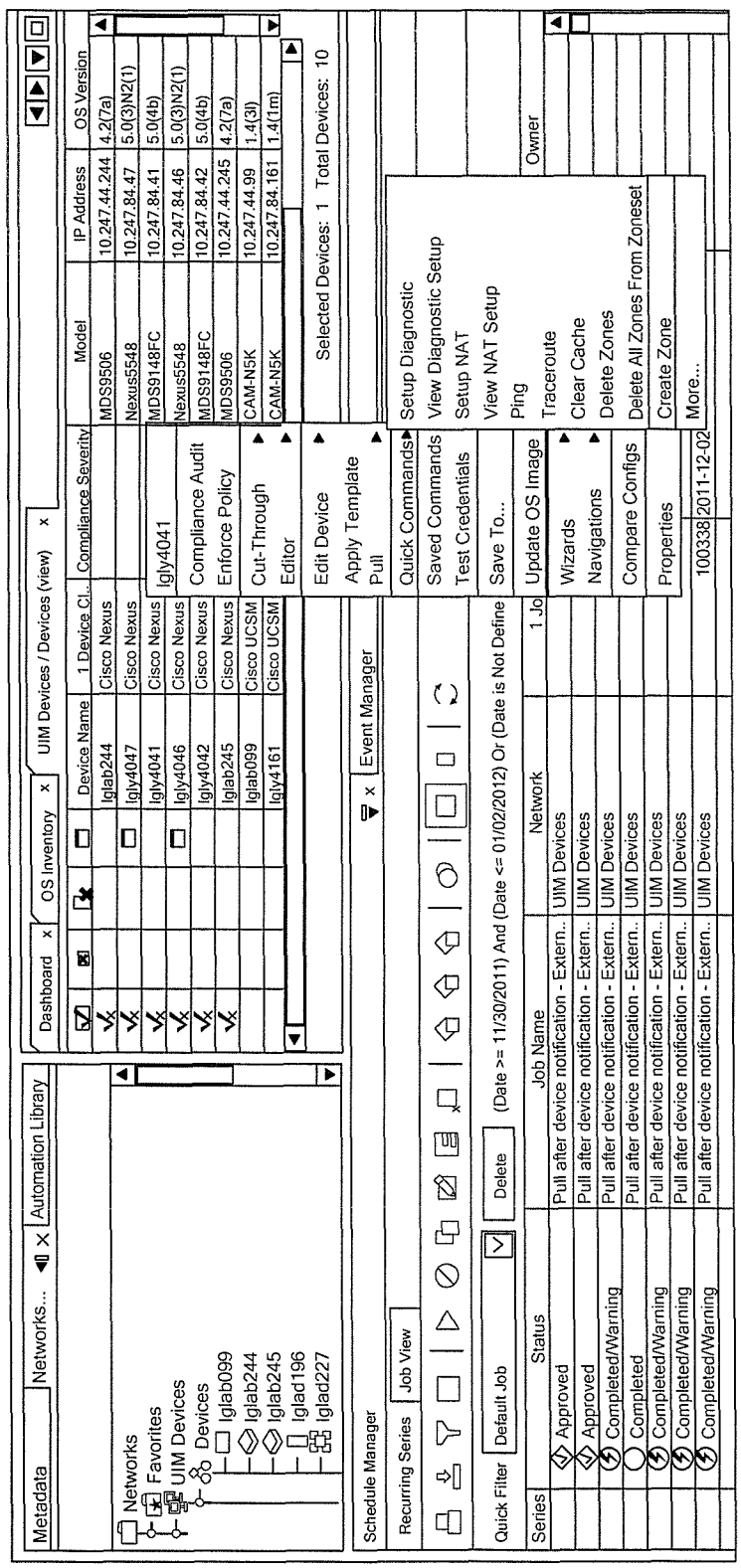
FIG. 13A is a user interface to enable a user to select a command.

FIG. 13A shows an exemplary user interface 1300 to enable a user to input information for a 'quick command' that is abstracted for a series of device types. The illustrative quick command is for CISCO NEXUS to create a new zone with two zone members. The user rights clicks on a device 1302 to get a quick command menu 1304 from which create zone 1306 is selected.

In FIG. 13B, an exemplary screen display 1310 includes fields into which the user can enter information for the create zone command. Exemplary fields include a VSAN ID field 1312, a Zoneset Name field 1314, a Zone Name field 1316, an optional Zone Member List field, 1318, and a Re-activate Zoneset field 1318

FIG. 13C shows a list 1320 of NEXUS quick commands and their parameters. For example, the create zone command of FIG. 13B is shown as device command 1322. As can be seen, the parameters of VSAN ID field 1312, a Zoneset Name field 1314, a Zone Name field 1316, an optional Zone Member List field, 1318, and a Re-activate Zoneset field 1318 are listed for the create zone interface 1310 of FIG. 13B.

FIG. 13D shows an exemplary list for SYMMETRIX and CLARIION quick commands and FIG. 13E shows an exemplary list for VNX commands.

Figure 14:
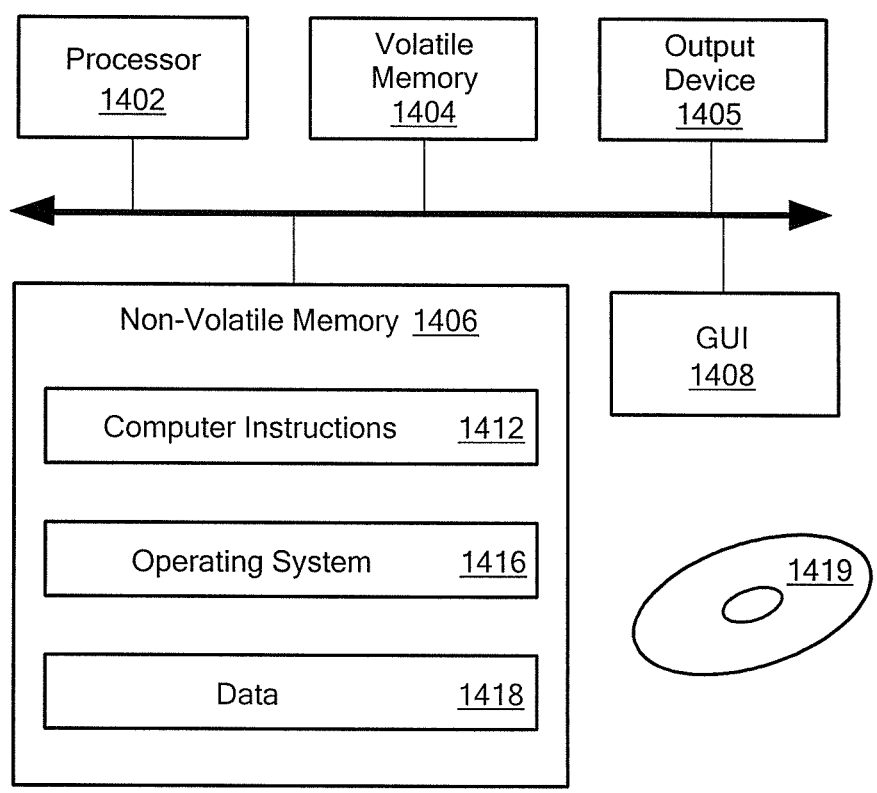
FIG. 14 is a schematic representation of an exemplary computer that can perform at least some of the processing described herein.

FIG. 14 shows an exemplary computer that can perform at least a part of the processing described herein. A computer includes a processor 1402, a volatile memory 1404, an output device 1405, a non-volatile memory 1406 (e.g., hard disk), and a graphical user interface (GUI) 1408 (e.g., a mouse, a keyboard, a display, for example). The non-volatile memory 1406 stores computer instructions 1412, an operating system 1416 and data 1418, for example. In one example, the computer instructions 1412 are executed by the processor 1402 out of volatile memory 1404 to perform all or part of the processing described above. An article 1419 can comprise a machine-readable medium that stores executable instructions causing a machine to perform any portion of the processing described herein.

Processing is not limited to use with the hardware and software described herein and may find applicability in any computing or processing environment and with any type of machine or set of machines that is capable of running a computer program. Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Programs may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processing.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method, comprising:
obtaining information on commands for a plurality of devices including devices of the same type having different command structures;
receiving a generic command line interface (CLI) command from a user directed to one of the devices of the same type;
determining-whether the generic CLI command is supported;
extracting parameters from the generic CLI command;
generating from the extracted parameters and the generic CLI command a device-specific command for execution by the one of the devices of the same type;
providing a single user interface to obtain information from the user for the generic CLI command that can be used for any one of the devices of the same type having different command structures; and
collecting output from a device in response to the device-specific command using terminal scraping; and
validating and transforming the collected output into a normalized model.

2. The method according to claim 1, wherein a first device type includes storage devices, a second device type includes blades, a third device type includes storage area network (SAN) devices, and a fourth device type includes switches.

3. The method according to claim 2, wherein the first device type includes storage devices from different vendors.

4. The method according to claim 2, wherein the second device type includes blades from different vendors.

5. The method according to claim 2, wherein the third device type includes SAN devices from different vendors.

6. The method according to claim 2, wherein the fourth device type includes switches from different vendors.

7. An article, comprising:
a computer-readable medium containing non-transitory stored instructions that enable a machine to perform:
obtaining information on commands for a plurality of devices including devices of the same type having different command structures;
receiving a generic CLI command from a user directed to one of the devices of the same type;
determining, using a computer processor, whether the generic CLI command is supported;
extracting parameters from the generic CLI command;
generating from the extracted parameters and the generic CLI command a device-specific command for execution by the one of the devices of the same type;
providing a single user interface to obtain information from the user for the generic CLI command that can be used for any one of the devices of the same type having different command structures;
collecting output from a device in response to the device-specific command using terminal scraping; and
validating and transforming the collected output into a normalized model.

8. The article according to claim 7, wherein a first device type includes storage devices, a second device type includes blades, a third device type includes storage area network (SAN) devices, and a fourth device type includes switches.

9. The article according to claim 8, wherein the first device type includes storage devices from different vendors.

10. The article according to claim 8, wherein the second device type includes blades from different vendors.

11. The article according to claim 8, wherein the third device type includes SAN devices from different vendors.

12. The article according to claim 8, wherein the fourth device type includes switches from different vendors.

13. A system, comprising:
a command abstraction module comprising:
a user interface to receive generic CLI commands from a user;
a command processor module to receive the generic CLI command and confirm the generic CLI command is supported;
a parameter extraction module to extract parameters from the generic CLI command;
a command generator module to create a device-specific command from the extracted parameters and the generic CLI command, the device-specific command having a syntax specific to particular device type,
wherein the command abstraction module can generate device-specific commands for a plurality of device types from the generic CLI command; and
a module to collect output from a device in response to the device-specific command and to use terminal scraping and to validate and transform the collected output into a normalized model.

14. The system according to claim 13, wherein the plurality of device types include components from different vendors.

15. The system according to claim 13, wherein the system comprises a cloud storage system comprising:
a compute layer;
a storage layer;
a network layer coupled between the compute and storage layer; and
a management layer to control the system,
wherein the plurality of device types include storage components having different command line interfaces (CLIs).

16. The system according to claim 13, the plurality of device types include a first device type including storage devices, a second device type including blades, a third device type including storage area network (SAN) devices, and a fourth device type including switches.

* * * * *

UNITED STATES PATENT AND TRADEMARK OFFICE
CERTIFICATE OF CORRECTION

PATENT NO. : 9,268,727 B1  
APPLICATION NO. : 13/536357  
DATED : February 23, 2016  
INVENTOR(S) : Anurag Jain et al.

Page 1 of 1

It is certified that error appears in the above-identified patent and that said Letters Patent is hereby corrected as shown below:

Title Page, item (73) Assignee delete "EMC Company" and replace with --EMC Corporation--.

Signed and Sealed this
Twenty-sixth Day of July, 2016

Michelle K. Lee
*Director of the United States Patent and Trademark Office*